US007213032B2

(12) United States Patent
Mascarenhas

(10) Patent No.: US 7,213,032 B2
(45) Date of Patent: May 1, 2007

(54) SYSTEM AND METHOD FOR ANONYMOUS TRANSACTION IN A DATA NETWORK AND CLASSIFICATION OF INDIVIDUALS WITHOUT KNOWING THEIR REAL IDENTITY

(75) Inventor: Desmond Mascarenhas, Los Altos Hills, CA (US)

(73) Assignee: Protigen, Inc., Sunnyvale, CA (US)

( * ) Notice: Subject to any disclaimer, the term of this patent is extended or adjusted under 35 U.S.C. 154(b) by 1448 days.

(21) Appl. No.: 09/899,489

(22) Filed: Jul. 5, 2001

(65) Prior Publication Data

US 2002/0019764 A1 Feb. 14, 2002

Related U.S. Application Data

(60) Provisional application No. 60/216,492, filed on Jul. 6, 2000.

(51) Int. Cl.
*G06F 17/00* (2006.01)
(52) U.S. Cl. ............... 707/104.1; 707/10; 707/102
(58) Field of Classification Search ............. 707/1, 707/104.1, 10, 102
See application file for complete search history.

(56) References Cited

U.S. PATENT DOCUMENTS 6,006,200 A 12/1999 Boies et al.
6,055,510 A 4/2000 Henrick et al.
6,128,663 A 10/2000 Thomas

OTHER PUBLICATIONS

Identity theft solutions disagree on problem; Goth, G.; Distributed Systems Online, IEEE vol. 6, Issue 8, Aug. 2005.*
Personalization through mask marketing; Strasser, M.; Zugenmaier, A.; System Sciences, 2003. Proceedings of the 36th Annual Hawaii International Conference on Jan. 6-9, 2003 pp. 8 pp.*
Identity Management and Data Sharing in the European Union; Otjacques et al..; System Sciences, 2006. HICSS '06. Proceedings of the 39th Annual Hawaii International Conference on vol. 4, Jan. 4-7, 2006 pp. 70a-70a.*

* cited by examiner

*Primary Examiner*—David Jung
(74) *Attorney, Agent, or Firm*—Morrison & Foerster LLP

(57) ABSTRACT

This invention relates generally to a computer-implemented method and system for having anonymous profiling of, and marketing to, anonymous users in a data network, particularly in the Internet. It enables an individual to surf the Internet anonymously as well as enabling third parties to use profiling information to target such anonymous users. The real identity of the individual is never known within the anonymous trust system.

15 Claims, 7 Drawing Sheets

SYSTEM AND METHOD FOR ANONYMOUS TRANSACTION IN A DATA NETWORK AND CLASSIFICATION OF INDIVIDUALS WITHOUT KNOWING THEIR REAL IDENTITY

CROSS-REFERENCE TO RELATED APPLICATIONS

This application claims the benefit of U.S. Provisional Application No. 60/216,492, filed Jul. 6, 2000, titled "System and Method for Anonymous Transaction In A Data Network and User Profiling of Individuals Without Knowing Their Real Identity."

This application relates to co-pending provisional application:
(1) Ser. No. 60/220,398, filed Jul. 24, 2000, titled "A method and system for a document search system using search criteria comprised of ratings prepared by experts";
(2) Ser. No. 60/216,469 filed Jul. 6, 2000, titled "System and method for matching Psychological Profile information with target information;
(3) Ser. No. 60/252,868, filed Nov. 21, 2000, titled "Interactive Assessment Tool.";
which are incorporated fully herein by reference.

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates generally to a computer-implemented system for having anonymous transaction-related activities and user classification performed in a closed or restricted data network, particularly on the Internet, while allowing for a system of value transfer to and from open systems on the Internet wherein transactions occur.

BACKGROUND

Employers and advertisers have used profiling for decades to target specific individuals for specific job functions, products, or services. Recently, there has been an increasing unease regarding the use of such psychological tools, especially with respect to liability exposure and invasion of privacy considerations. In a Harris telephone survey conducted in March 2000, a majority of the 1,014 adult respondents felt uncomfortable having information tracked in a Web site or their user profile linked to their real identity or to other third party databases. This is because user profiles are typically bought by marketing companies to enable such companies to target (targeted marketing) these users (potential customers), such as by sending them emails or brochures about their products and/or services, with or without the users' consent. (Users and individuals herein are used interchangeably).

Targeted marketing employs information about the user. Internet service providers (ISPs), for example, monitor users (who are logged into their proprietary system or Web site) and their real identity, enabling them to create a user profile for each user based on the actions of the user within the system, as well as the characteristics of the users (e.g., based on the type of advertisements clicked, type of articles read, the hyperlinks selected, the gender of the user, resident zip code of the user, responses to surveys, and the like). The user profile is then used to enable the ISP, advertiser, and/or other third parties to display advertisements, articles, and other information that would likely interest that particular user. The underlying problem is that matching is done to induce the user into participating in a transaction, at which point the user's name, address, credit card or other personally identifiable information is solicited in order to complete the transaction and have the product or service delivered to the individual. Thus, a profile can be linked to the user's real identity post facto, since the entire sequence of events (profiling, selective presentation, transaction) occurs within a single open network. An ISP, moreover, can determine a user's real identity by looking into its database. This is particularly true since ISPs do not have a separate system (e.g., different databases) to handle transactions that could protect the user's real identity (e.g., subscription sign-up or purchase transactions). Hence, the problem with such systems is that the user's identity is linked to the user's profile, and ISPs or other parties collecting, creating, or maintaining user profiles may sell such information with or without the user's consent. Thus, there is a need for a system where an individual's real identity is uncoupled or separated from the individual's user profile at all times, thereby protecting the user's privacy.

Targeted marketing, however, is beneficial both to users and to third parties (e.g., vendors) to enable more efficient matching of products and/or services. Thus, a way to reconcile the need for efficient matching with an individual's desire not to have personal sensitive information be collected and, potentially, misused is desired. A system where the real identity of an individual is never known would alleviate such privacy concerns.

Several patents address anonymous transactions, i.e., transactions protecting individual's privacy, such that the individual's personal information is protected from disclosure to unauthorized parties. For example, U.S. Pat. No. 6,128,663, issued Oct. 3, 2000, titled "Method and Apparatus for Customization of Information Content Provided to a Requestor Over a Network Using Demographic Information Yet the User Remains Anonymous to the Server," teaches a system which obtains demographic information about a computer user, transmits the demographic information to other content servers on the network, whereby the various content servers can supply customized banner ads or customized web page content to a user based upon the demographic profile of the user. The demographic profile includes demographic information such as sex, marital status, age, salary, children, job type, city & state of residence, political affiliation, etc., as well as other user preference information. However, the patent teaches that this demographic profile would provide privacy to the user because these various web servers visited by the user would not be provided with personal information about the user such as name, address and phone number. However, the use of this system is explicitly intended to result in a sale or other transaction during which the user's real identity must be disclosed (for shipping the product, or charging a credit card) such that the profile can be linked to the identity post facto. This is an explicit possibility whenever the profiling and the ensuing transaction occur within the same open network, such as the world wide web.

No presently known patents or other documents, however, addresses the profiling of anonymous individuals, i.e., individuals whose real identity is unknown, creating and maintaining user profiles for anonymous individuals for privacy concerns and targeted marketing, or having a system unaware of the user's real identity at any time, even after a transaction is consummated.

Any conventional online transaction requires disclosure of user identity at the time that money changes hands. It is relatively simple for a vendor to take credit card information, for example, and match it to an individual's data (such as financial data, social security number, and so on) stored in third party databases. Marketing of products has traditionally involved a seamless combination of marketing activity (such as displaying an advertisement) and the purchasing transaction.

With the advent of online profiling methodologies, targeted marketing of products online has reached new proportions. Vendors will typically generate and store profiles of customers, with full knowledge of their real-world identities. Even in cases where the user's identity is not initially known, the general purpose is to make a sale—at which juncture, the user's real identity becomes known to the system.

Prior to this invention, no barrier has ever been erected between private or anonymous profiling followed by presentation of selected information (on the one hand) and the identity-disclosing purchasing transaction (on the other hand).

U.S. Pat. No. 6,006,200, for example, issued to Boles et al., teaches a method of protecting a user's address and, optionally, the user's name when ordering products. The user's address and name are stored by a trusted provider, typically a shipper, which has an agreement with the user to not sell its database to outside marketing organizations. The shipper assigns a unique identifier to each user. Every time a user wants to purchase a product from a vendor, the user merely indicates the user's unique identifier as the shipping address. The vendor then sends the product to the shipper with the user's unique identifier. The user's shipping address and name are then retrieved from the trusted provider's database and the product is shipped accordingly without the vendor ever knowing the user's real address and/or name. This system requires at least one party in the marketing transaction to know the user's real identity. More importantly, this system does not provide for the cash transaction, which typically precedes shipping, and during which the user is generally required to disclose identity. The party making the sale will likely gain access to the user's identity (for example, through their credit card number). Thus, protecting identity during shipping offers limited protection of a user's privacy.

U.S. Pat. No. 6,055,510, issued to Henrick et al., teaches a method for enabling targeted marketing of users while maintaining the user's privacy. The patent takes advantage of the knowledge, for example, of an Internet Service Provider (ISP), by having such ISP create lists of users with common interest. The system sends to such users emails containing advertisement information and a hyperlink to the advertiser's Web site. Only when a user selects the hyperlink is the user's real identity disclosed to the advertiser. In this method, the user's identity and profile are known to the ISP, thus offering no protection of a user's privacy (from the ISP).

The patents discussed above, moreover, disclose a method where both the user's real identity and profile are, or become known by at least one system or party in the invention.

From the discussion above, it should be apparent that there is a need for a system that creates and maintains a user profile of an individual without associating that profile to the individual's real identity at any time. Furthermore, such a profile should be useful in marketing products and services to the individual, without the system ever knowing the individual's real identity.

BRIEF SUMMARY OF INVENTION

The invention enables a user to log into a Web site within a closed network anonymously, have the user be profiled without revealing the user's real identity, having the system gather information about such anonymous user, and having the system create and maintain a user profile for such anonymous user. Because the system never gathers information about the user's real identity, a user profile associated with the user's real identity is never created. Moreover, the system allows for a system of representational or tokenized value which can be utilized in transactions independently initiated by the user outside the closed system, wherein the user's real identity can never be linked to the original profile.

What is claimed is a computer implemented method for anonymous profiling of, and marketing to, anonymous users comprising the acts of providing a mechanism for a user to log into a closed network or system where the user's identity is not known and where the user is identified by a unique identifier; monitoring the user's activity and responses in the closed network or system, by tracking the unique identifier; generating or maintaining a profile related to the unique identifier based on the user's activity and wherein the user's identity is never revealed to any part of the closed network or system that generates, maintains and employs the profile, and wherein identity-revealing transactions involving the products, services or information can occur only outside the closed network or system.

A system for matching anonymous users with information using similar mechanisms is also disclosed.

DETAILED DESCRIPTION OF INVENTION

Figure 1:
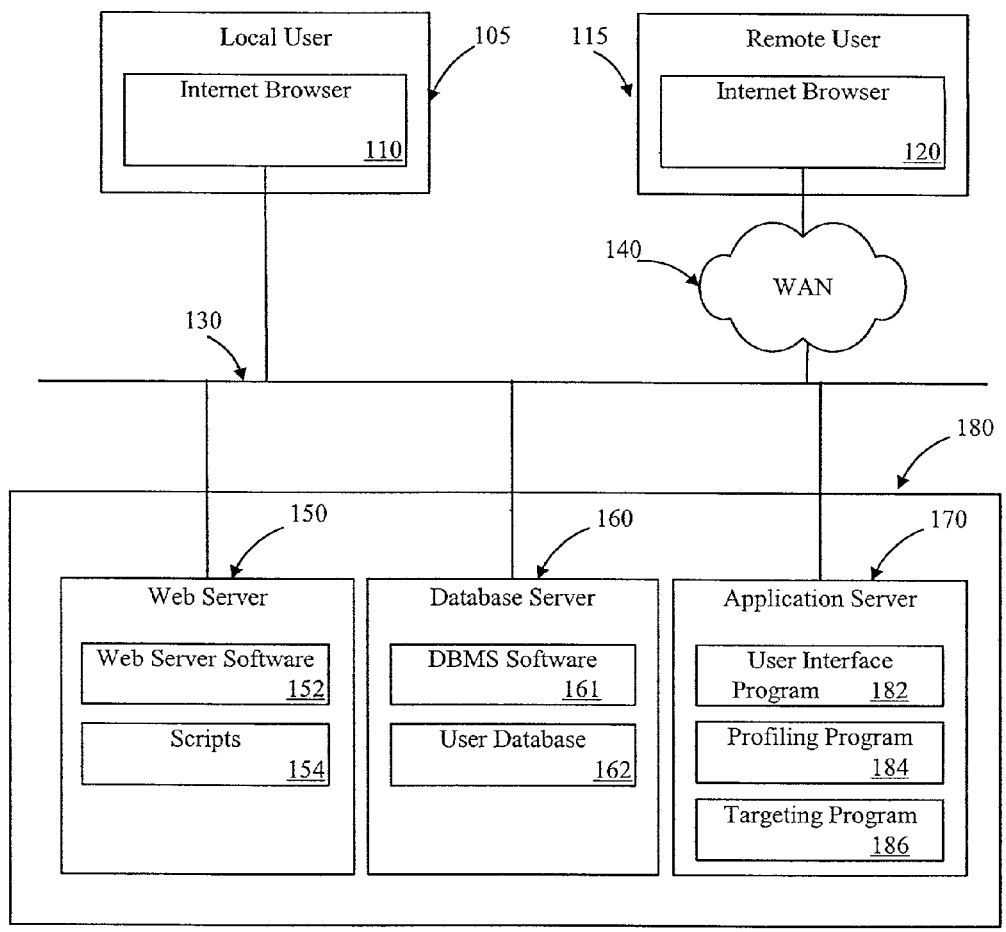
FIG. 1 is a diagram illustrating an exemplary architecture of the present invention.

A user profile as defined herein means anonymously collected information about a user within a closed network or system. The user profile contains user attributes, such as, but not limited to, age, zip code, likes, dislikes, Web Sites visited, purchasing patterns, recently bought products, pets, political affiliation, religious behavior, income, socioeconomic status, articles read, search terms used, country of residence, date of birth, gender, household income, occupation, number of years in that occupation, average amount of hours spent watching television in a week, psychological profile, classifications based on available psychological tests, learning styles, education, types of advertisements clicked, books read in the last six months, and the like.

A closed network or system means a restricted access space (such as a collection of "single-sign-on" websites on the World Wide Web, or an intranet) within which user's real identities are never asked for, but where user preference or experience profile information may be gathered. Neither identity nor profile information is ever passed into or out of this closed network or system. However, representational or tokenized transactional value can be passed into or out of this closed network or system, provided however that such representational or tokenized value does not contain either profile or identity information.

Transactions are enabled through a mechanism of representational or tokenized value that can traverse the boundaries of said closed network or system. Representational or tokenized value is any coded information (such as a coded text string) that can be generated or redeemed by the user inside or outside the closed network or system, provided however that such coded information contains neither profile nor identity information.

A user profile may be used by a third party, such as an advertiser, to target that particular user within the closed network or system. A user profile may be generated in a number of ways (including, but not limited to): predicted profiles of behavior based on cognitive style; self-reported interest surveys; self-reported background surveys; actual measured behavior (such as transactional behavior or game performance); and composites involving one or more of the preceding categories of information.

Targeted marketing as defined herein does not only include presenting information for potential commercial gains (e.g., advertisements, video clips or information about products and/or services, and the like), but also includes presenting information to a user for non-commercial purpose, e.g., for the user's education.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

The invention will be described by way of illustration with reference to a specific psychological testing method, referred to as a Personality Trait Topography ("PTT"), but it should be understood that other psychological testing tools and profiling methods may also be employed in the present invention. This invention also covers other interfaces such as those using voice or a touch screen.

System Architecture

FIG. 1 shows an exemplary basic system architecture to carry out the present invention. A user (local user 105 or remote user 115, respectively) employs typically a computer or an Internet-enabled appliance containing an Internet browser software 110, 120 to access and connect to an Anonymous Trust Provider (ATP) 180.

An ATP 180 is a trusted provider, which promises or has an agreement with the user to never endeavor to determine the user's real identity and to never store the user's real identity within the ATP system. (Real identity as defined herein typically includes the user's name, address, social security number, and credit card numbers). In the preferred embodiment, the ATP 180 displays a notice stating that the ATP gathers information and profiles the user, but that the user is only known in the system by a unique identifier and never by the user's real identity. Optionally, the ATP may sign an agreement with the user to not sell the user profile to third parties. (To "display" herein does not only include visual presentation but also audio presentation.)

The ATP 180, typically, consists of a standard Internet or Intranet web server 150 that is capable of sending Web pages and processing scripts, a database server 160 that stores and handles database manipulation and updates, and an application server 170 that contains and executes the logic embodying the features of the present invention. The ATP may also contain a number of domains or Web Sites (e.g., www.atp1.com (online bookstore) and www.atp2.com (online travel agency)). In the preferred embodiment, only one user name is needed to log into the entire ATP system. (A Web site is a group of related documents (e.g., HTML, XSL, or XML files) and associated files, scripts, and databases that is served up by a Web server on the Internet.)

The Web server 150, database server 160, and application server 170 are connected to a data network, such as a local area network 130 which may also be connected to the Internet through a wide area network (WAN) 140. The Web server is a device, typically a computer, which contains a Web server software 152 and scripts 154. Scripts are programs that contain instructions that may be executed, for example, by a Web server software. Scripts are typically written using scripting languages, such as JavaScript, Microsoft® VBScript, Microsoft® Active Server Page, and Allaire® ColdFusion. Microsoft® Internet Information Server is an example of a Web server software.

The database server 160 is a device, typically a computer, which contains a database management system (DBMS) software 161, as well as the data used and/or manipulated in the present invention. Microsoft® SQL Server and Oracle's™ DBMS products are examples of DBMS software.

The user database 162 maintains data on users who are part of the system. A user's real identity, however, is never stored or defined because the system identifies a user by a unique identifier rather than being identified with the user's real identity information such as real name, social security number, and the like. The user database 162 also contains the anonymous user profile of such anonymous user.

Other databases, containing target information, may also be added depending on system design, implementation, and functions. For example, if the ATP 180 also functions as a presence provider, i.e., provides information or contents on the Internet, the system may also have databases that contain articles, video clips, sound clips, images, advertisements, documents, news, music, and the like, which may be presented to the users. (Target information as defined herein includes information that a user may want to do a search on and information that may be displayed or presented (e.g., visually or auditory) to the user. It may also include information such as information on products and services, articles, sound clips, logos, advertisements, images, videos, and the like.) The ATP may also function as an online interactive training tool, a search portal, an offer or coupon redemption center, a travel reservation system, and the like.

One skilled in the art will realize that variations on the database defined herein, such as the user database 162, may be implemented and still embody the features of the present invention.

The user interface program 182 generally comprises program logic that displays Web pages to users. Depending on the functions provided by the ATP, it may include, but is not limited to, program logic that displays Web pages that enables users to register within the system, take psychological tests, search the system for products or services, take online educational interactive courses, play games, answer surveys, and the like. In the preferred embodiment, the user interface program 182 is employed using a Web server software in conjunction with scripts.

The profiling program 184 is a software program that creates and maintains the user profile for the anonymous user by considering the user's responses, such as to psychological tests or surveys, and user's actions such as type of advertisements clicked, articles read, hyperlinks clicked, options chosen, keywords entered on search boxes, purchasing patterns, and the like. The profiling program may employ any available profiling tools and/or methods, as well as use the personality trait topography (PTT) test described in more detail below. The profiling program 184 as shown herein protects the user's privacy because the user is only identified with a unique identifier, and, thus, is always anonymous in the ATP system.

If the ATP contains more than one Web site (or domains), the profiling mechanism of the present invention is shared within the system, thereby enabling a user profile information in one domain to be available to other domains within the system.

The targeting program 186 is a software program that determines which target information is best suited, preferred, or interesting to the user. Typically, each target information also has a matching profile that contains attributes that are compatible with or match those of the user profile. (A profile for such target information is herein referred to as target profile. The attributes are predefined in the system such that the product attributes match or are compatible with or relate to at least some of the attributes contained in the user profile.) Depending also on the Web sites contained in the ATP 180, different make ups (or types) of profiles are created. Thus, the user profile and target profile for a travel-related Web site are different from those contained in an online bookstore Web site.

To explain an embodiment of how a targeting program 186 works, an attribute needs to be defined in both the target profile and user profile. The different attributes, classification, or taxonomy of a user profile and a target profile are typically predetermined and also are defined such that they are both compatible with, related to, or match each other. Based on the commonly defined attributes, the targeting program 186 returns the unique identifier of the user if there is a match or correlation between the attributes contained in the target profile and the user profile. For example, if a target information (e.g., product), such as a speedboat, is defined to have an income attribute of 35 (meaning that the boat is more likely to be interesting to users with income greater or equal to $35,000/year), the targeting program returns a list of users (via unique identifiers) whose user profiles also contain an income attribute equal to or greater than $35,000/year. One skilled in the art will realize, however, that other targeting program or methods may be used to implement the features of the present invention.

Figure 1A:
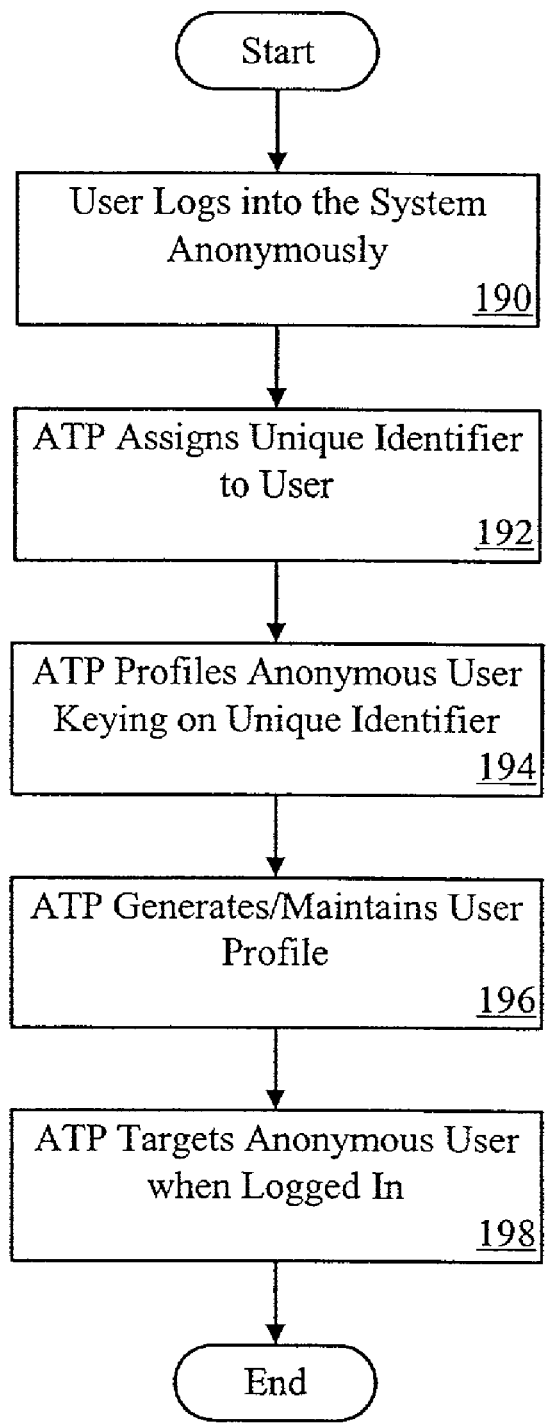
FIG. 1A illustrates the basic steps to employ the features of an anonymous trust provider.

FIG. 1A illustrates the basic steps of the present invention. In the first step, at box 190, the user logs into the ATP 180 anonymously by supplying a pseudonym or a user-supplied user name unrelated to the user's real identity. Typically, the user is asked for a user-supplied user name and password when the user initially logs into the system and. They are stored (typically in a user database 162 (see FIG. 1)) and updated, if necessary, by the ATP 180 to enable the user to login again to the ATP. In the preferred embodiment, a warning is displayed on the login interface (or Web page) stating to the effect that the user should not enter information or use a user name that may reveal the user's real identity. It is also preferred, that a notice is presented alerting the user that the user is going to be profiled in the ATP, but without the user's real identity being determined or stored.

One skilled in the art will also realize that the user-supplied user name may actually contain information that may reveal the user's real identity. To ensure that no information about the real individual is ever revealed or is kept, the ATP may take a user-supplied user name and convert it to a unique identifier, for example, by using a hash function to convert the user name to another string of characters unrelated to the supplied user-name. (Hashing involves mapping a string of characters into a numerical value, and is well known in the art.)

Assuming that the user name is unique to the system, the ATP 180 assigns a unique identifier to the user at box 192. The user name may also act as the unique identifier or a unique identifier may be assigned and linked to the user name entered. One skilled in the art will realize that there are many ways to generate or create a unique identifier.

In step 194, the ATP, particularly, the profiling program 184 (in FIG. 1), profiles the anonymous user using the unique identifier as key. Typically, the user may be profiled when the user is logged into the ATP.

In step 196, the ATP generates and maintains a user profile for the anonymous user. The user profile may be updated if new information, such as new survey responses are obtained from the user. In step 198, the anonymous user is targeted by having the ATP display only information whose target profile (e.g., some attributes of the target profile) matches that of the user profile (e.g., matches the attributes of the user profile).

In essence, the ATP 180 (also applicable to the ATP illustrated in FIGS. 2 and 3) does not store and is unaware of the user's real identity because the user logs in anonymously, e.g., via a pseudonym, rather than using the user's real identity. Furthermore, the ATP 180 identifies each user in the system with a unique identifier, e.g., "ATP3478A989," that is not related in any way to the user's real identity. In addition, to ensure that the ATP never captures the user's real identity, transactions, interfaces, and responses that may potentially reveal the user's real identity are taken out of and relegated outside of the ATP 180, e.g., to other Web sites available on the Internet.

Figure 2:
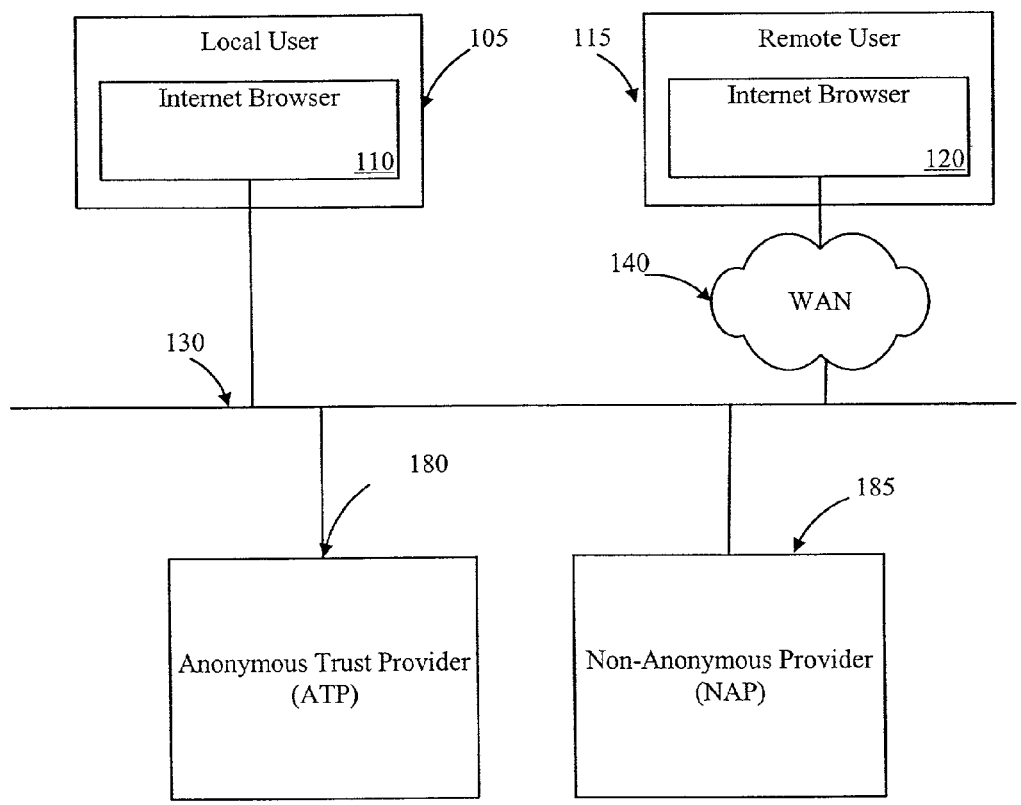
FIG. 2 illustrates an exemplary basic embodiment of the present invention where a user wishes to conduct a non-anonymous transaction.

FIG. 2 is an exemplary basic embodiment of the system architecture of the present invention where a user wishes to conduct a non-anonymous transaction and where all aspects of profiling are separated from non-anonymous transaction. A non-anonymous transaction as defined herein is a transaction where a user's real identity may potentially be revealed. Non-anonymous transactions may include, but are not limited to, purchase transactions, shipping transactions, credit card transactions, and the like.

In this system, similar to FIG. 1, a user (105 or 115) connects to the ATP 180 and the Non-Anonymous Provider (NAP) 185 via the user's Internet browser (110 or 120) (or Internet-enabled appliance) and through a data network (130, 140) such as the Internet. In this embodiment, the ATP profiles the user and acts like a typical Web site (depending on the functions provided by the ATP), except that non-anonymous transactions are not enabled in the ATP. (A NAP is any Web Site or system that potentially may require the user to disclose the user's real identity. The NAP may also conduct its own profiling using the user's real identity.) In this embodiment, the user's real identity may be contained in the NAP 185 (e.g., when the user purchases a product).

To access the features of the present invention, the user logs into the ATP and is identified by the ATP by a unique identifier, rather than by the user's real identity. While surfing the Web sites contained in the ATP 180, the user may, at any time, conduct a non-anonymous transaction. This scenario may occur, for example, when a user is interested in purchasing a product by clicking on a hyperlink. When the user clicks on the hyperlink, the user leaves the ATP and is transferred to a NAP, because the user may potentially be required to supply the user's real identity, such as name, billing address, and shipping address to complete the purchase.

The hyperlink contains the URL (uniform resource locator or address) of the NAP, such that when the user clicks on the hyperlink, the user's web browser accesses and/or connects to the NAP web site and thus leaves the ATP system. Such hyperlink (or HTTP request) generally do not pass any profiling information to the NAP, except, maybe the address of the referring Web site, which is the ATP. Furthermore, the databases used by the ATP and the NAP are distinct and separate databases, with no form of database links or reference to each other, enabling the ATP to determine the user's real identity.

One skilled in the art will realize that the timing or when the user gets transferred to a NAP is dependent on the system design and implementation. In the preferred embodiment, a warning is presented stating to the effect that the user is now leaving the ATP and that the user may now be profiled with the user's real identity linked to user profiles created or maintained by other systems.

The ATP 180 does not generally send user profile information to the NAP 185. However, some audit information (which may also be contained in the user profile), such as the referring Web Site, the ad clicked that transferred the user to the NAP, or the like may also be transmitted to the NAP.

While a user is surfing the Web sites contained in the ATP, the ATP 180 uses the profiling program 184 (in FIG. 1) to gather information about such user, and creates and maintains a user profile based on the user's unique identifier. Because the unique identifier is not associated to the user's real identity, even if the user profile is ever disclosed to the public, the user's real identity is never revealed.

FIG. 2, in essence, is similar to the embodiment illustrated in FIG. 1, except that the ATP 180 automatically transfers the user to a NAP 185 for non-anonymous transactions.

The ATP may also conduct targeted marketing by running the targeting program 186 (in FIG. 1). For example, while the user is surfing an ATP 180 Web site, targeted ads may be presented depending on the user profile and the target profile of the ads. For example, if the user is surfing an online bookstore, targeted ads about magazine subscriptions that the user probably would like to read are displayed.

Figure 3:
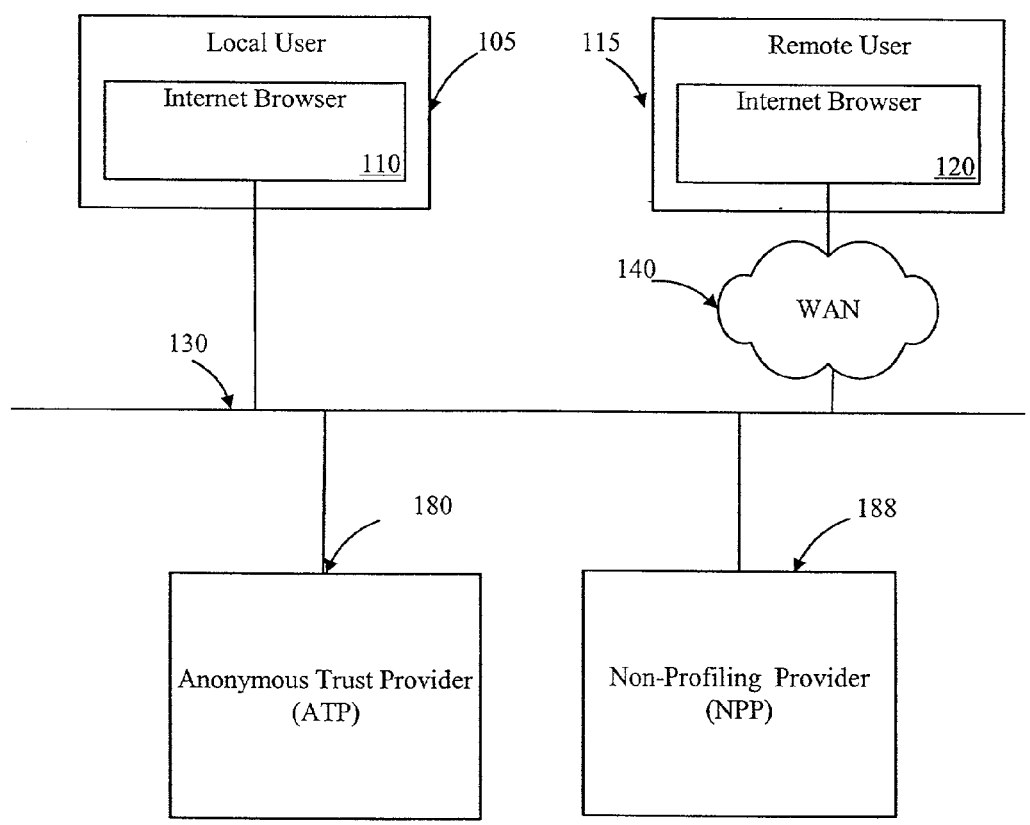
FIG. 3 illustrates another alternative exemplary embodiment of the present invention

FIG. 3 is an exemplary alternative architecture for implementing the features of the present invention. In this system, a user 105, 115 connects to the ATP 180 and to a Non-Profiling Provider 185 via a data network 130, 140. The ATP profiles the user through the user's unique identifier and also sends targeted marketing information to the NPP 188. The NPP targets anonymous users based on the information sent by the ATP and does not have any profiling capabilities. (There can be more than one NPP interfacing with the ATP, such that the ATP acts like a central liaison system that interfaces to various NPPs. In addition, the NPP may contain one or more Web sites. Such hyperlink (or HTTP request) generally do not pass any profiling information to the NPP, except, maybe the address of the referring Web site, which is the ATP. Furthermore, the databases used by the ATP and the NPP are distinct and separate databases, with no form of database links or reference to each other, enabling the ATP to determine the user's real identity.)

The NPP 188 also contains target information, such as information on products, services, and the like. The target information contained in the NPP also has a corresponding target profile that is compatible with, related to, or matches those user profiles contained in the ATP 180.

Figure 4:
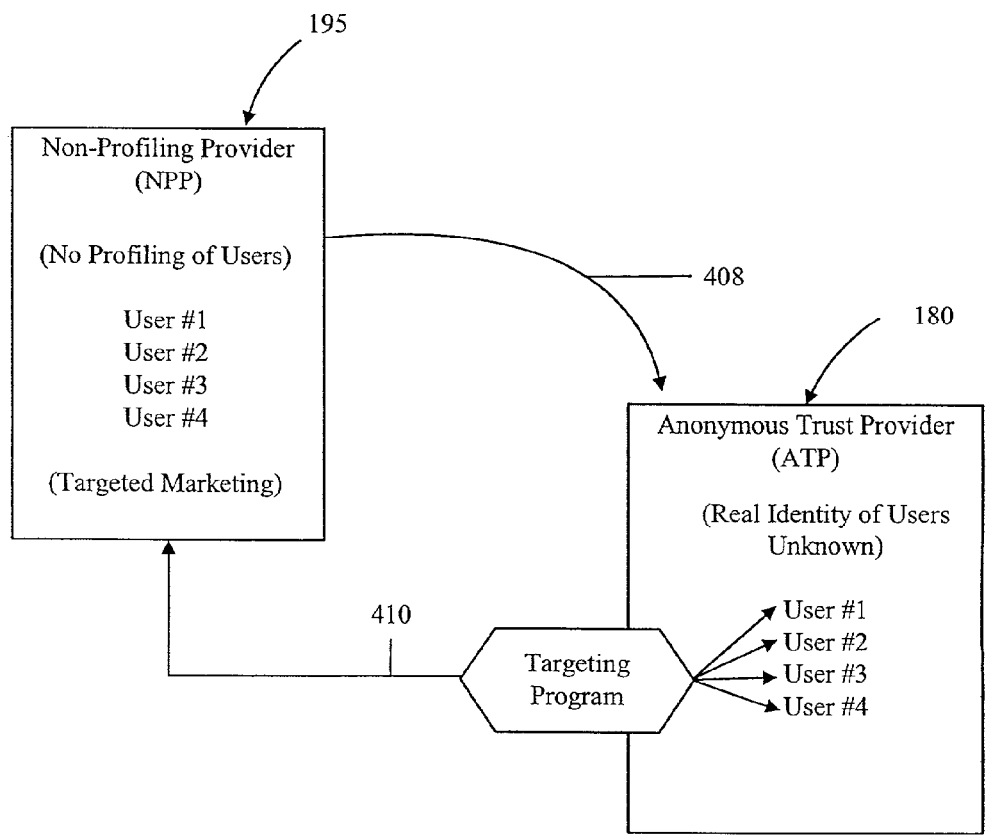
FIG. 4 is a diagram illustrating the data flow between a Non-Profiling Provider and an Anonymous Trust Provider.

FIG. 4 is a diagram illustrating the data flow between an NPP 188 and an ATP 180. As shown in the diagram, the NPP contains no user profile and users are explicitly assured of this in a legally binding manner, such as in a privacy policy notice posted in the NPP Web site. Targeted marketing is also done in the NPP 188.

Similar to the ATP contained in FIGS. 1 and 2, the ATP of FIG. 4 has generic interfaces and tools for gathering profiling data. To be profiled, users from the NPP may either explicitly travel or access the ATP Web site (e.g., typing the URL address), or preferably, the interfaces and tools of the ATP are embedded in the NPP, for example, a frame (ATP) within a frame (NPP) implementation. In a frame within a frame implementation, a user seemingly is within the NPP Web site, when in actuality, the user is within the ATP. In another embodiment, the NPP may contain one or more hyperlinks to the ATP, indicating to the user to access the ATP system to be anonymously profiled. Similarly, the ATP may contain hyperlinks to NPPs registered within the system. (Thus, the user has a choice of accessing the NPP or the ATP first.)

Users are identified in the NPP 195 by a unique identifier, thus User #1, User #2, User #3, and User #4 illustrated in box 195 are represented by their own unique identifier. To be profiled, the users access the ATP 180 (e.g., automatically transferred by the NPP, by clicking on a hyperlink or by typing the ATP's URL (uniform resource locator) address). Depending on implementation, the unique identifier may be passed from the NPP to the ATP in several ways. One way is for the NPP to send the user's unique identifier when it transfers the user to the ATP (e.g., via a hyperlink with parameter included in the URL header). Another way is for the user to enter the same unique identifier (used by the NPP) in the ATP 180.

While the user is in the ATP 180, the user is profiled. Thus, to obtain targeted marketing information, the NPP 195 makes a request (for targeted marketing information) to the ATP (as shown in arrow 408) via a generic interface, for example, via an HTTP request. This request 408 typically includes attributes (contained in the target profile) about the target information, e.g., a product or a service, as well as information about the vendor. The ATP 180 using its targeting program 186 (shown in FIG. 1) determines which unique identifiers within the user database 162 (shown in FIG. 1) are compatible with or matches those attributes (e.g., product or service attributes contained in target profile(s)) sent by the NPP. The ATP 180 then sends the result of the targeting program to the NPP 195 as shown in arrow 410. This targeting program need not necessarily be a one-to-one match but may also be based on a scoring system.

For example, an attribute income is both defined in the target profile and user profile. If the attribute contained in the request 408 is defined to have income of 35 (e.g., means that this product, for example, is best for users with income greater or equal $35,000/year), such request 408 sent from the NPP 195 to the ATP is asking the ATP to return a list of unique identifiers (i.e., anonymous users) whose income attribute is defined to be 35 or more. In another example, if an NPP has several ads that it wants to display on its Web site, the ads displayed thus depend on which user is logged in, the target profile of the advertisement to be displayed, and the user profile of the user.

One skilled in the art will recognize that the unique identifier used in the NPP need not necessarily be the same unique identifier as in the ATP; for example, User #1 may be identified in the NPP as unique identifier "NPP1" while the same User #1 is identified in the ATP by the unique identifier "ATP1." As long as a link to these different unique identifiers is available, for example, a table equating "NPP1" to "ATP1," the features of the present invention may be employed.

One skilled in the art will also realize that the ATP may contain various functions that may interface with the NAP 185 (FIG. 2) and the NPP 188 (FIG. 3). For example, if coupons are posted in the ATP Web site, such coupon may be redeemed in the NAP 185 (or the NPP 188) by passing the unique identifier and the coupon number recognized by the NAP 185 (or the NPP 188). The ATP and the NPP or the NAP may work in conjunction to have a loyalty program, for example, earned credits by surfing the ATP. Users of the NPP or the NAP may then redeem such earned credits. The ATP may also function as an online mall, where multiple vendor Web pages are aggregated at a single Web page contained in the ATP. See the examples below for how this interaction between the ATP, NAP and NPP might work.

One skilled in the art will recognize that other uses of the user's user profile may be employed. For example, a chat room categorized by attributes may be created thus enabling users of similar personality to chat with each other. For example, the ATP system (shown in FIGS. 1, 2, and 3) may have the capability of having an "on the fly" system for posting and displaying peer-comment bulletin boards (e.g., based on attributes on the user profile).

Personality Trait Topography

One way of creating and maintaining a user profile as well as a target profile is by using personality trait topography test (PTT). The PTT comprises a psychometric inventory in which user responses to a set of questions are solicited on a seven-point scale. Other embodiments include a number of psychological tests, preferably consisting of a personality test, a design taste test, a color test, an interactive game module, a recreation/travel test, a life satisfaction test, and a career/job test. An alternative psychological testing methodology may be substituted for the PTT.

The PTT is a psychological test, which measures several characteristics (listed in Table I).

TABLE I

Sample Characteristics of PTT

| Index | Characteristics |
|---|---|
| 1 | OJ ("O" = Open-Ended/"J" = Judgmental) |
| 2 | FU ("F" = Focused/"U" = Unfocused) |
| 3 | CB ("C" = Concrete/"B" = Abstract) |
| 4 | TP ("T" = Territorial/"P" = Pacifist) |
| 5 | EM ("E" = Empiric/"M" = Mythic) |
| 6 | AG ("A" = Anomic/"G" = Gregarious) |
| 7 | IX ("I" = Internal Locus of Control/"E" = External Locus of Control) |

PTT is conducted by asking a user a set of questions addressing the characteristics that are measured. Based on the user's response, the profiling program 184 (in FIG. 1) then classifies the user.

1. Index OJ.

Index OJ measures the novelty-seeking characteristic of a user. Type "O" (open-ended) users consider all decisions to be provisional and, thus, are constantly reevaluating issues. They do not care much for regimentation, and generally will ignore rules that they deem do not make sense. Typically, they are spontaneous and are happy to make plans as they go along. Type "J" judgmental) users, on the other hand, are typically driven by rules, tradition, and formal decision-making processes, and are generally law-abiding. They expect and feel comfortable with some amount of regimentation and structure in their lives. They typically plan ahead and feel uncomfortable just 'playing it by ear.'

2. Index FU.

Type "F" (focused) users (line 2) typically tend to be driven, "one-track-minded," "goal-oriented," and intensely focused on their endeavors. Often they will work for hours, while completely oblivious to surroundings. They tend to take things seriously, and sometimes, need to learn to lighten up. Type "U" (unfocused) users, on the other hand, tend to take things lightly. They tend to take frequent breaks while working and are very conscious of their immediate surroundings and, thus, are easily distracted from their current work or purpose. They tend to have the philosophy that having fun is more important than achieving goals.

3. Index CB.

Type "C" (concrete) (line 3) users tend to be detail-oriented, tend to be very sensitive to their immediate surroundings, are more interested in the details rather than in the big picture. Generally, they have little patience for grand ideas and theories, and are more likely to focus on the present rather than on the future. Type "B" (abstract) users, on the other band, tend to easily synthesize information and abstract ideas. Their insights make them excellent "high-altitude" or "big picture" analysts. They usually are good inventors and are able to easily conceptualize complex systems. They tend to enjoy reading novels with complicated but ingenious plots and tend to be good at extrapolating to the future.

4. Index TP.

Type "T" (territorial) users (line 4) tend to be aggressive, to be very loyal, to root for the home team, to not value diversity, to be very team-oriented, and to be fierce competitors. Thus, they will often exclude "outsiders." Type "P" (pacifist) users, on the other hand, tend to look for mediated solutions to conflict and are more willing to consider rehabilitation than punishment. They tend to be "politically correct," to be very inclusive of other cultures and ways of life, to have diverse interests, and to see the planet as an organic whole.

5. Index EM.

Type "E" (empiric) users (line 5) are driven primarily by logic, not subject to making emotional decisions as other people, at times, cold and unemotional, methodical and hierarchical in their thinking, and often very intelligent. They tend to look for the facts of the case before making a decision. Type "M" (mythic) users are generally spiritual, superstitious, and very likely to believe in the supernatural, in an after-life, or reincarnation. They are likely to consider the existence of angels and extraterrestrials and believe in their existence. They tend to be exceptionally receptive to nature, art, and beauty.

6. Index AG.

Type "A" (anomic) (line 6) users are often loners and enjoy solitary pursuits. They tend to place a low value on social status, fashion, and chitchat, tend to be independent thinkers and usually develop extremely close relationships with pet animals. Type "G" (gregarious) users, on the other hand, often value their status within their own social group, and will tirelessly work to improve their standing. They tend to pay great attention to appearances and grooming, and "fitting in" with their friends. They are great to have at parties and often adopt socially extroverted behaviors, even if this is an unnatural characteristic of their personalities.

7. Index IX.

Type "I" (internal locus of control) users (line 7) tend to take responsibility for their own actions and the consequences thereof, and generally have a better self-esteem than average people. They see their lives as being under their own control, with the outcome dependent upon their own actions. Type "X" (external locus of control) users, on the other hand, have low self-esteem, tend to blame luck or some external authority for their own failings in life, and tend to seek and often meekly submit to the direction from others. They usually feel a sense of powerlessness about their world and feel that they are incapable of changing the world to their own advantage.

Table II below shows sample archetypes based on the characteristics listed in Table I.

TABLE II

Sample Archetypes

| Archetype (Most Frequent Characteristics) | Analysis |
| --- | --- |
| Artist (M, A, U, O) | Favored professions: artist, social worker<br>Disfavored professions: lawyer, entrepreneur<br>Job Performance: poor at dealing with both subordinates and authority<br>Musical tastes: non-traditional forms of music (eclectic)<br>Areas of greatest life satisfaction: spiritual life<br>Areas of lowest life satisfaction: income, current job<br>Favorite activities: music, reading, creative pursuits |
| Banker (X, J, C, T) | Favored professions: engineer, scientist, banker<br>Disfavored professions: lawyer, politician<br>Job Performance: good with superiors, excellent record-keeping<br>Musical tastes: rock-n-roll, country<br>Areas of greatest life satisfaction: community, government<br>Areas of lowest life satisfaction: current job, income<br>Favorite activities: music and reading, social activities |
| Counselor (P, O, I, M) | Favored professions: artist, social worker<br>Disfavored professions: scientist, engineer<br>Job Performance: good at group processes, meetings<br>Musical tastes: jazz, blues<br>Areas of greatest life satisfaction: home/dwelling, career success<br>Areas of lowest life satisfaction: government, local community<br>Favorite activities: social activities, creative pursuits |
| Devotee (C, X, P, M) | Favored professions: social worker<br>Disfavored professions: lawyer, entrepreneur<br>Job Performance: terrible at dealing with subordinates, great record-keeping<br>Musical tastes: all kinds<br>Areas of greatest life satisfaction: family, dwelling, spiritual life<br>Areas of lowest life satisfaction: income, available leisure time<br>Favorite activities: outdoor recreation |
| General (T, B, E, J) | Favored professions: entrepreneur, engineer<br>Disfavored professions: artist, social worker<br>Job Performance: excellent with subordinates, hates group process of decision-making<br>Musical tastes: rock-n-roll<br>Areas of greatest life satisfaction: choice of profession, family, and community<br>Areas of lowest life satisfaction: current job, income<br>Favorite activities: social activities, spectator sports |
| Manager (F, J, G, E) | Favored professions: entrepreneur<br>Disfavored professions: artist<br>Job Performance: excellent dealing with superiors, okay with record-keeping<br>Musical tastes: classical<br>Areas of greatest life satisfaction: career success<br>Areas of lowest life satisfaction: friends, community, available leisure time<br>Favorite activities: outdoor recreation, sports |
| Politician (I, B, O, M) | Favored professions: politician, lawyer<br>Disfavored professions: engineer<br>Job Performance: poor record-keeping, poor at dealing with the boss, great with subordinates.<br>Musical tastes: gospel, light classical<br>Areas of greatest life satisfaction: choice of profession, career success<br>Areas of lowest life satisfaction: family relationships, physical fitness<br>Favorite activities: sailing, music and reading, social activities |
| Trustee (G, E, F, C) | Favored professions: lawyer<br>Disfavored professions: artist<br>Job Performance: excellent with bosses and subordinates, poor record-keeping<br>Musical tastes: all kinds<br>Areas of greatest life satisfaction: choice of profession, physical fitness<br>Areas of lowest life satisfaction: friends, spiritual life<br>Favorite activities: outdoor recreation, spectator sports |
| Soldier (U, E, I, T) | Favored professions: engineer<br>Disfavored professions: artist<br>Job Performance: great at dealing with subordinates, hates meetings<br>Musical tastes: easy listening, top 40<br>Areas of greatest life satisfaction: physical fitness, community<br>Areas of lowest life satisfaction: dwelling, family relationships<br>Favorite activities: music and reading |

One skilled in the art will recognize that other characteristics and archetypes, including other classification, may be measured and developed to classify users. Furthermore, one skilled in the art will recognize that other psychological testing methods aside from PTT may be employed to create a classification that would be used by the system to match users with target information. Furthermore, one skilled in the art will realize that the characteristics and archetypes described above may be attributes defined in a user profile and target profile.

User Interface and Classification Method

Figure 5:
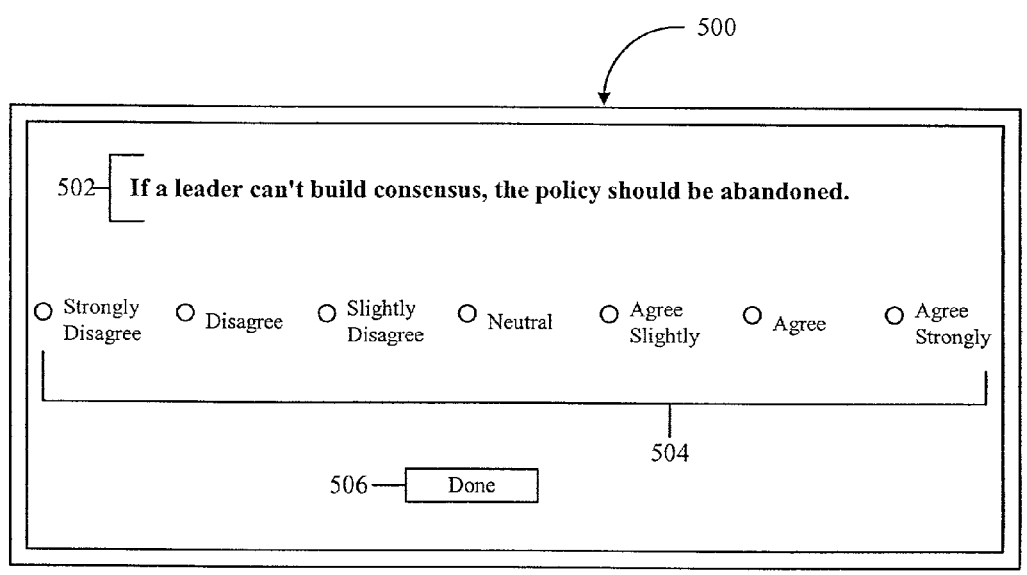
FIG. 5 illustrates an exemplary representation of a user interface enabling a user to enter a response to a question from a psychological test.

FIG. 5 is an exemplary representation of a user interface or GUI, such as a Web page, enabling a user to take a psychological test, e.g., a PTT assessment.

The personality test portion of PTT quantifies the user's personality. The personality test asked a set of questions, which the user may respond by choosing one of the displayed options. For example, in FIG. 5, the question 502 ("If a leader can't build consensus, the policy should be abandoned") is a sample question testing the personality of the user. The user responds by clicking on one of the option boxes (as shown in 504). Each question is scored on a seven-point scale (−3 to +3) where −3 is "Strongly Disagree" and +3 is "Agree Strongly," (with each user's response contributing to the relevant characteristic and/or archetype measured, e.g., adding 3 points or subtracting 3 points). The user's response is then stored in an appropriate user database, in this case, the user database 162 (in illustrated in FIG. 1).

The response of the user may be ignored in the calculation or creation of the user profile depending on traditional measures such as factor analysis and discriminant analysis. Answers to questions that do not show a factor analysis, i.e., show a 0.40 correlation coefficient or less, for example, to the desired characteristic, are ignored in determining or calculating the user profile.

The profiling program 184 (illustrated in FIG. 1) calculates the mean and standard deviation for all answers for each user and then normalizes the answers based on these two numbers, thereby expressing a set of responses as normalized standard deviations. Each response is then multiplied by an appropriate factor, to generate an aggregate score set, representing the user profile. Each aggregate score set contains a score for each characteristic Listed in Table 1.

The aggregate score set is then further normalized by taking the aggregate score set of a suitable large number of users (e.g., more than 75), calculating a mean and standard deviation for each type of aggregate score for each characteristic, and then further normalizing each user's score for that distribution. The final result is a set of normalized aggregate scores expressed as standard deviations, i.e., the scores are normalized within a normalized aggregate score set compared to the result of each user.

The profiling program 184 generates a user profile or a portion of it based on the user's responses. The user profile may also be expressed as a mnemonic string of characters that contains the three most deviant characteristic scored (normalized aggregate scores), plus an indicator for the strongest correlation to the existing archetypal patterns.

For example, in a system including PTT method, a user may be categorized as "MAU9R" meaning he is a "mythic," "anomic," and a "unfocused." The string "9R" means that in a scale of 1 to 10, the user is a nine (9) in the Artist archetype shown in Table II. Thus, a user search requesting for target information (e.g., products and services) using the keyword, "travel," for example, results in a web page listing target information that contains an "M" on the Empiric_Mythic field, "A" on the Anomic_Gregarious field, or "U" on the Focused_Unfocused field to target that particular "MAU9R" user.

The design taste test measures the design and taste preference of the user. The design taste portion displays a number of sketches of house interiors and asks the user's preference by having the user select one of the options displayed (e.g., "Strongly Dislike," "Dislike," "Slightly Dislike," "Neutral," "Like Slightly," "Like," and "Love It."). Each question is scored on a seven-point scale (−3 to +3) where −3 is "Strongly Dislike" and +3 is "Love It."

The Recreation/Travel survey measures the recreation and travel preference of the user by asking the user to enter his or her response in an online survey form. (This online survey form is implemented by using a Web server software and scripts.) The user, for example, is asked to list the titles of three favorite books, to list the titles of five favorite movies, to list five activities (unrelated to the user's employment) which the user has spent the most time during the past year, and to list three subjects (unrelated to the user's employment) which the user wants to learn more about. The user enters the responses into the online form and accordingly submits the responses by clicking on the "Submit" button.

The Life Satisfaction Survey measures the user's satisfaction with life in general. A set of questions is posed to the user, which the user responds to by selecting an option box ("Highly Unsatisfied," "Unsatisfied," "Slightly Unsatisfied," "Neutral," "Slightly Satisfied," "Satisfied," and "Very Satisfied.") Sample questions include: "How satisfied are you with your current job?"; "How satisfied are you with your current choice of profession?"; "How satisfied are you with your current family income?;" "How satisfied are you with the amount of time you have available for recreational activities?"; and the like. Each question is scored on a seven-point scale (−3 to +3) where a score of −3 is "Highly Unsatisfied" and +3 is "Very Satisfied."

The Jobs/Careers test measures how compatible a user is with a particular job. Questions include, for example, "With appropriate training, how well do you think you could perform as an accountant or banker?;" "With appropriate training, how well do you think you could perform as a scientist?;" "With appropriate training, how well do you think you could perform as a high school schoolteacher?;" and the like. The user gives his answer by selecting one of the options displayed (e.g., "Extremely Poorly," "Poorly," "Somewhat Poorly," "About Average," "Moderately Well," "Well," and "Extremely Well.") Each question is scored on a seven-point scale (−3 to +3) where a score of−3 is "Extremely Poorly" and +3 is "Extremely Well."

One skilled in the art will recognize that variations on how the psychological test is presented may be done. For example, instead of a question and answer way of obtaining response from a user, the psychological test may be presented via a game embodiment. In addition, variations of the questions or types of questions may be employed in the invention.

Referring to FIGS. 2 and 3, targeted marketing may be employed in a number of ways. In FIG. 2, once the user logs into the ATP and is identified by the user's unique identifier, the ATP retrieves the user's user profile, e.g., the mnemonic code "MAU9R," based on the user's unique identifier. One skilled in the art will recognize that other information about the user may also be retrieved from the corresponding database. After the ATP 180 retrieves the user profile, the system may target the user by showing ads that would likely interest the user on the ATP Web site. This may be implemented by having the system show only advertisements that match the user's attributes, such as retrieving product advertisements, which are classified for ARTISTS (i.e., contain a "yes" on the artist field).

Similarly, in FIG. 3, once the user is identified within the ATP system, the ATP retrieves all unique identifiers based on the product attributes sent by the NPP. Based on these attributes, the ATP searches for the matching or compatible unique identifiers as described in the above paragraph. The ATP then sends a list of unique identifiers to the NPP. Based on the list received by the NPP, advertisements are only presented when those users in the lists are logged into the NPP system.

Figure 6:
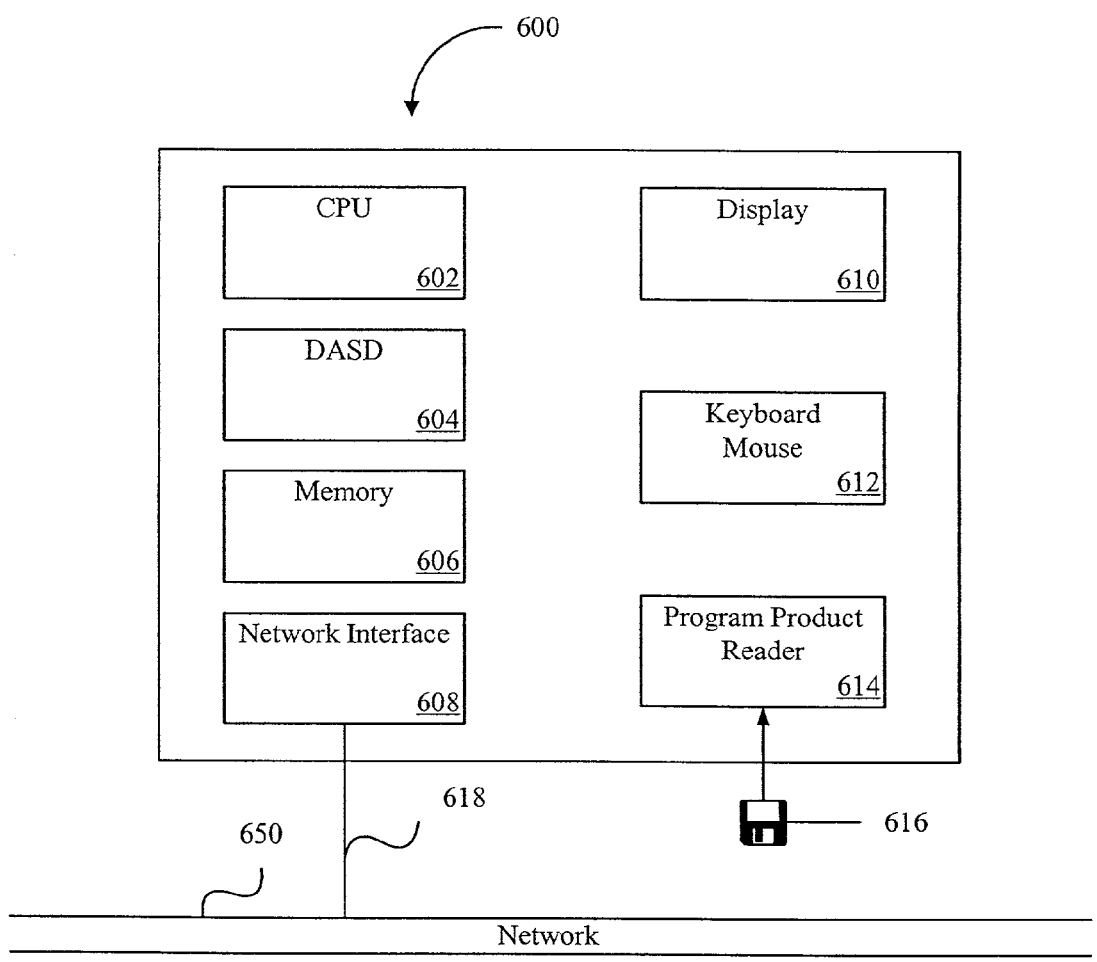
FIG. 6 illustrates a block diagram representation of one of the computers in the system illustrated in FIGS. 1, 2, and 3.

FIG. 6 is a block diagram of an exemplary computer 600 such as might comprise any of the servers or computers in FIG. 1. Each computer 600 operates under control of a central processor unit (CPU) 602, such as a "Pentium™" microprocessor and associated integrated circuit chips, available from Intel™ Corporation of Santa Clara, Calif., USA. A computer user can input commands and data from a keyboard and mouse 612 and can view inputs and computer output at a display 610. The display is typically a video monitor or flat panel display device. The computer 600 also includes a direct access storage device (DASD) 604, such as a fixed hard disk drive. The memory 606 typically comprises volatile semiconductor random access memory (RAM). Each computer preferably includes a program product reader 614 that accepts a program product storage device 616, from which the program product reader can read data (and to which it can optionally write data). The program product reader can comprise, for example, a disk drive, and the program product storage device can comprise removable storage media such as a floppy disk, an optical CD-ROM disc, a CD-R disc, a CD-RW disc, DVD disk, or the like. Each computer 600 can communicate with the other connected computers over the network 620 through a network interface 608 that enables communication over a connection 618 between the network and the computer.

The CPU 602 operates under control of programming steps that are temporarily stored in the memory 606 of the computer 600. When the programming steps are executed, the pertinent system component performs its functions. Thus, the programming steps implement the functionality of the system components illustrated in FIG. 1. The programming steps can be received from the DASD 604, through the program product 616, or through the network connection 618. The storage drive 604 can receive a program product, read programming steps recorded thereon, and transfer the programming steps into the memory 606 for execution by the CPU 602. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 606 over the network 618. In the network method, the computer receives data including program steps into the memory 606 through the network interface 608 after network communication has been established over the network connection 618 by well-known methods that will be understood by those skilled in the art without further explanation. The program steps are then executed by the CPU 602 to implement the processing and features of the present invention.

It should be understood that all of the computers of the systems illustrated in FIGS. 1, 2, and 3, preferably have a construction similar to that shown in FIG. 6, so that details described with respect to the FIG. 6 computer 600 will be understood to apply to all computers of the systems in FIGS. 1, 2, and 3 (ATP 180, NAP 185, NPP 188). Any of the computers can have an alternative construction, so long as they can support the functionality described herein.

One skilled in the art will recognize that variations in the steps, as well as the order of execution, may be done and still make the invention operate in accordance with the features of the invention.

The present invention has been described above in terms of a presently preferred embodiment so that an understanding of the present invention can be conveyed. There are, however, many configurations for an anonymous trust provider not specifically described herein but with which the present invention is applicable. The present invention should therefore not be seen as limited to the particular embodiments described herein, but rather, it should be understood that the present invention has wide applicability with respect to network cache systems generally. All modifications, variations, or equivalent arrangements and implementations that are within the scope of the attached claims should therefore be considered within the scope of the invention.

I claim:

1. A computer implemented method for anonymous profiling of, and marketing to, anonymous users comprising the acts of:
    a) providing a mechanism for a user to log into a closed network or system where the user's real identity is not known and where such user is identified by a unique identifier that is unique to the closed network or system;
    b) monitoring said user's activity and responses in the closed network or system, by tracking the unique identifier;
    c) generating or maintaining a profile related to the unique identifier based on said user's activity and responses in the closed network or system; and
    d) employing said profile to market products, services or information to the user;
    wherein the user's real identity is never revealed to a part of the closed network or system that generates, maintains and employs the profile, and wherein identity-revealing transactions involving said products, services or information can occur only outside said closed network or system.

2. A method as defined in claim 1 where said identity-revealing transactions are enabled through a mechanism of representational or tokenized value that can traverse the boundaries of said closed network or system.

3. A method as defined in claim 1 where said profile was based on the user's responses to a PTT.

4. A method as defined in claim 3 where said PTT is accessed by a user via the Internet or a data network.

5. A method as defined in claim 4 where said access is anonymously via a pseudonym.

6. A method as defined in claim 1, further comprising an act of storing target information in a database, wherein a target information file contains a classification compatible with the set of classifications defined for a user profile.

7. A method as defined in claim 6, further comprising the act of matching user to target information by using said generated or maintained profile for the user and the classification of the stored target information.

8. A computer program product recorded in a computer-readable media for anonymous profiling of, and marketing to anonymous users comprising:
    a) a first program code mechanism configured to permit a computer user to log into a closed network or system where the user's real identity is not disclosed and where such user is identified by a unique identifier that is unique to the closed network or system;
    b) a second program code mechanism, electronically coupled to the first program code mechanism, configured to monitor the user's activity and responses in the system by use of the unique identifier;
    c) a third program code mechanism, coupled to the second program code mechanism, configured to generate or maintain a profile for the user based upon the user's activity and responses in the system; and
    d) a fourth program code mechanism, coupled to the third program code mechanism, configured to match one a more attributes of the profile with classification data related to data for products, services and information, whereby relevant products, services and information data can be displayed to the user, and whereby the user's real identity is not revealed to any part of the system that generates, maintains or uses the profile.

9. A computer program product as defined in claim 8, wherein the third program code mechanism is configured such that the profile is based on a PTT.

10. A computer program product as defined in claim 9, wherein the third program code mechanism is configured such that said PTT is accessed by a user via the Internet or a data network.

11. A computer program product as defined in claim 10, wherein said access is anonymously via a pseudonym.

12. A system for matching anonymous users with information, comprising:
  a) a central processing unit that can establish communication with a user computer;
  b) a storage device electronically coupled to the central processing unit;
  c) the central processing unit configured to permit a person at the user computer to log into the system where the person's real identity is not known and where such person is identified by a unique identifier that is unique to the system;
  d) the central processing unit further configured to monitor the person's activity and responses in the system by tracking the unique identifier;
  e) the central processing unit further configured to generate or maintain a profile based on the person's activity and responses in the system; and
  f) the central processing unit further configured to match one or more attributes of the profile with classification data related to data for products, services and information, whereby relevant products, services and information data can be displayed to the person, and whereby the person's real identity is not revealed to any part of the system that generates, maintains or uses the profile.

13. A system as defined in claim 12 wherein the system is implemented in a distributed data network.

14. A computer implemented method for anonymous profiling of, and marketing to, anonymous users comprising the acts of:
  a) providing a mechanism for a user to log into a closed network or system where the user's real identity is not known and where such user is identified by a unique identifier that is unique to the closed network or system;
  b) monitoring said user's activity and responses in the closed network or system, by tracking the unique identifier;
  c) generating or maintaining a profile related to the unique identifier based on said user's activity and responses in the closed network or system, wherein the profile is based on the user's responses to a PTT; and
  d) employing said profile to market products, services or information to the user, wherein one or more attributes in the profile are matched to one or more classifications in the files containing products, services and information data;
  wherein the user's real identity is never revealed to any part of the closed network or system that generates, maintains and employs the profile, and wherein identity-revealing transactions involving said products, services or information can occur only outside said closed network or system.

15. A method as defined in claim 14 wherein said transactions are enabled through a mechanism of representational or tokenized value that can traverse the boundaries of said closed network or system.

* * * * *